Oct. 29, 1968  J. JULLIEN-DAVIN  3,407,655
COMPENSATED ANEMOMETER, ESPECIALLY FOR THE
MEASUREMENT OF LOW VELOCITIES
Filed Feb. 23, 1965  2 Sheets-Sheet 1
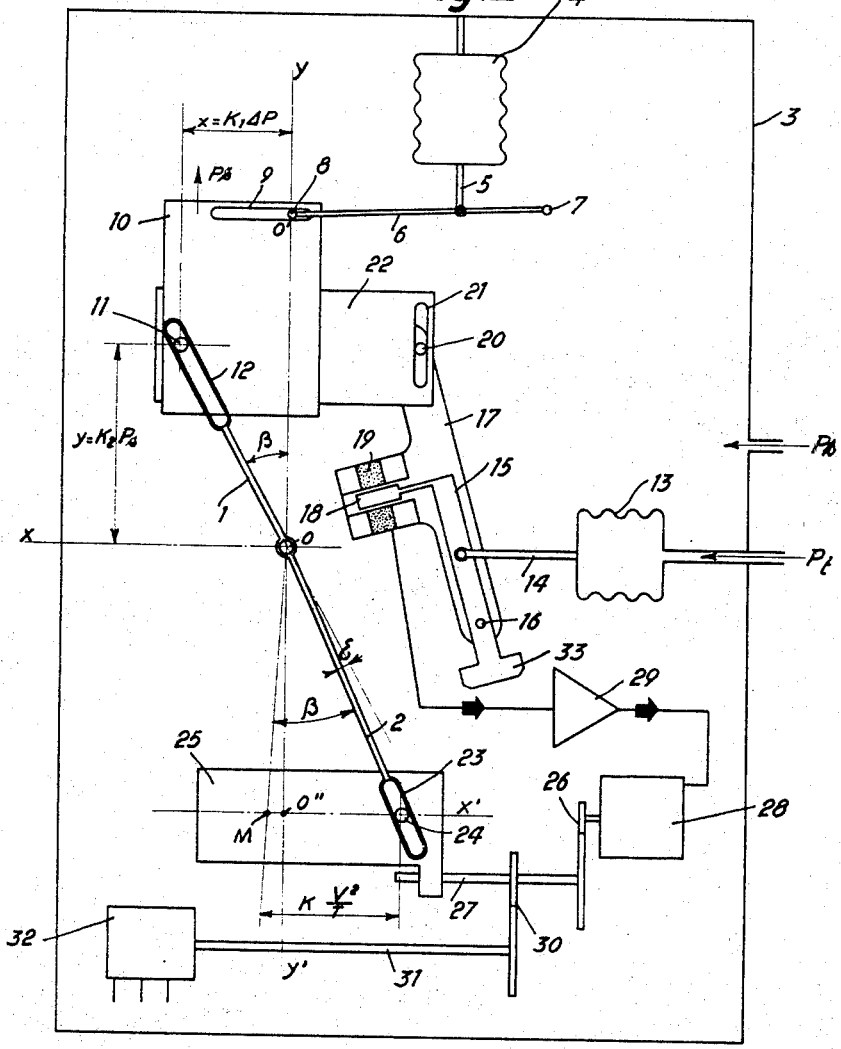
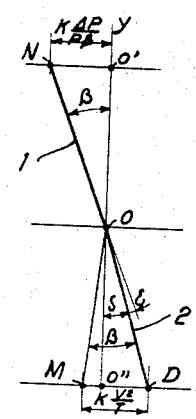
INVENTOR
JEAN JULLIEN- DAVIN
BY SPARROW and SPARROW
ATTORNEYS

United States Patent Office 3,407,655
Patented Oct. 29, 1968

3,407,655
COMPENSATED ANEMOMETER, ESPECIALLY FOR THE MEASUREMENT OF LOW VELOCITIES
Jean Jullien-Davin, Valence, France, assignor to Crouzet, Valence, France, a French company
Filed Feb. 23, 1965, Ser. No. 434,183
Claims priority, application France, Feb. 24, 1964, 964,871
6 Claims. (Cl. 73—182)

ABSTRACT OF THE DISCLOSURE

An anemometer for measuring of the actual speed of an aircraft with respect to the velocity of the wind. Capsules responsive to air pressures and potentiometers operated by the deflections of the capsules, a differential transformer with a magnetic core movable in a coil, a temperature sensing probe for correcting the setting of one of the potentiometers, a servomechanism receiving voltages from the potentiometers and mechanical and electronical devices computing the velocity from the input provided by the capsules and the potentiometers according to the St. Venant equation for wind velocity.

---

The present invention has for its object a compensated anemometer whihc permits the measurement of the actual speed of an aircraft with respect to the air (air speed) or of wind velocity with respect to a fixed point, this measurement being effected in the range from zero velocity up to velocities of the order of 300 knots, maintaining a high precision of indication over the entire range.

The device in accordance with the invention is of the type comprising means responsive to static pressure $P_s$, means responsive to the difference $\Delta P$ between the total pressure $P_t$ and the static pressure $P_s$, means for measuring the absolute temperature $T$ and operating means electro-mechanically computing the value of the velocity from the above-mentioned values, corresponding within a sufficient approximation to the St. Venant equation for the velocity:

$$V = \sqrt{T} \sqrt{\left(1 - \frac{1}{\left(1 + \frac{\Delta P}{P_s}\right)^{1/3.5}}\right)} \quad (1)$$

The symbols used in the equation are:

$V$ = velocity
$T$ = temperature
$P_t$ = total pressure
$P_s$ = static pressure
$\Delta P = P_t - P_s$
$A, B$ = parameters
$K, K_1$ and $K_2$ = parameters The device in accordance with the invention is characterized in that said operating means consist of a mechanism representing the quantity $$x = \frac{\Delta P}{P_s}$$

and controlled by said mechanism responsive to $\Delta P$ and $P_s$, of a mechanism controlled by said quantity $x$ and representing the quantity $y$ which is an homographic function of $x$:

$$y = \frac{Ax}{1 + Bx} \quad (2)$$

wherein $A$ and $B$ are chosen so that $y$ acquires the value $$1 - \frac{1}{\left(1 + \frac{\Delta P}{P_s}\right)^{1/3.5}}$$

in respect of two arbitrarily selected values of the quantity $$x = \frac{\Delta P}{P_s}$$

or, in other words, so that the curve representing the function $y$ which is given by Formula 2 should coincide with the curve representing the function $V^2/T$ which is given by Equation 1 at three of its points including the origin and, finally means controlled by said means for measuring $T$ and said means representing $y$ in such a manner as to represent the quantity $V^2 = yT$.

For the measurement of low velocities, $A$ and $B$ will be determined by the condition that the two curves have the same tangent at the origin and have a common point corresponding to a given velocity, for example 300 knots.

In one particularly simple form of embodiment, the mechanism representing the quantity $x$ consist of a first rigid arm pivotally mounted in a fixed plane about a fixed point, the angular coefficient of the direction of said first arm relatively to a fixed axis of said plane representing precisely a quantity which is proportional to $x$, and the mechanism representing the quantity $y$ which is an homographic function of $x$ consist of a member movable in a translation orthogonal to said fixed axis, the sliding motion of which is controlled by a second arm which is rigidly coupled to the first and displaced with respect to said first arm through an angle $\epsilon$ such that $tg\epsilon = B$, the translational motion of said member then representing precisely the quantity $y$.

Calculation and experience show that, when adopting the value $\epsilon = 4°10'$, the relative error in respect of the value of $V^2/T$ which is given by said device in accordance with the invention with respect to that which is given by the St. Venant equation remains smaller than $1/1000$ in respect of velocities within the range 0 to 300 knots.

Control of the pivotal arm can be ensured, for example, by means of two anemometer capsules which are both subjected externally to the static pressure $P_s$, but in the interior of one of which is created a vacuum while the interior of the other capsule is subjected to the total pressure, and the connection beween said capsules and said arm can be carried ino effect by means of a system of pivoting levers and sliders having two degrees of freedom.

It is preferable to insert in the pivotal arm control circuit a servomechanism comprising two members movable relatively to each other and the variations of position of which initiate the displacement of said pivotal arm as a result of any suitable action which may be produced either by inductance, capacitance, photoelectric or mechanical means.

One form of embodiment of the device in accordance with the invention will now be described by way of example and not in any limiting sense, reference being made to the accompanying drawings, in which:

FIG. 1 is a diagrammatic representation of the essential part of the invention.

FIG. 2 is a general arrangement diagram of that section of the device which relates to the measurement of $V^2/T$.

Figure 3:
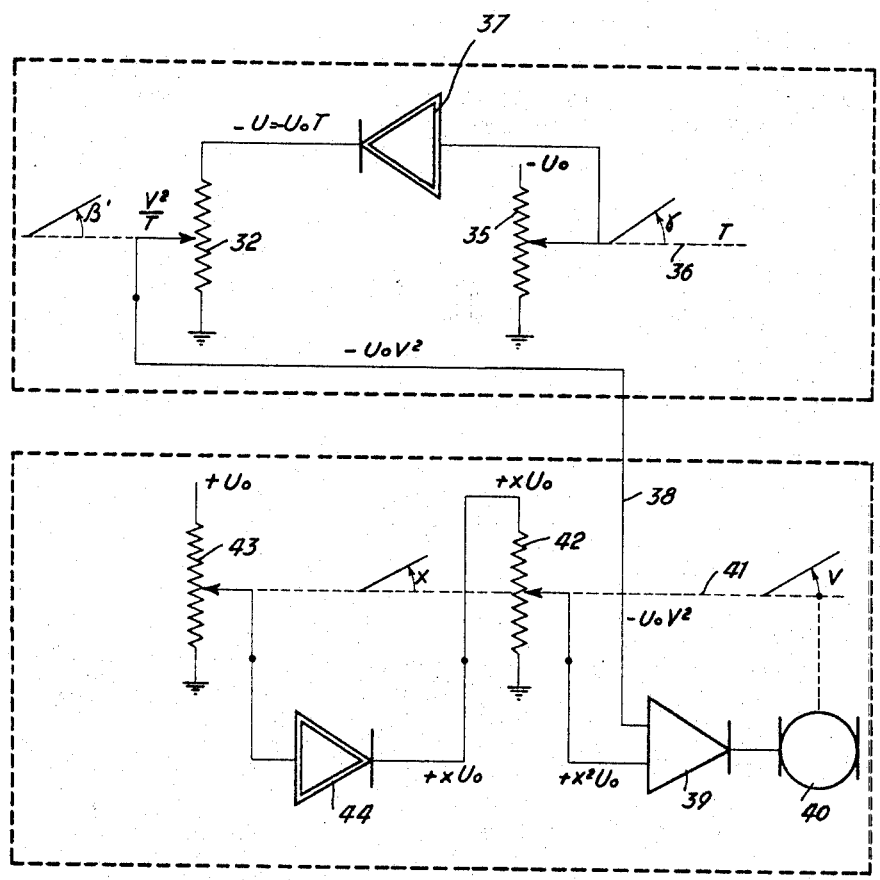
FIG. 3 is a diagram of the electronic system for computing the value of $V$ on the basis of $V^2/T$.

In the example which has been shown in the drawings, the value of the quantity $$x = \frac{\Delta P}{P_s}$$

is represented by the angular coefficient $\tan \beta$ of the direction taken by a pivotal arm 1 in a plane about the O aixs relatively to a fixed direction Oy of said plane, that is to say by the distance O'B swept by said lever on the fixed axis which is perpendicular to Oy at O'. A second arm 2 which is rigidly coupled to the arm 1 is mounted in a direction which makes an angle $\epsilon$ with the line of extension of the arm 1. Under these conditions, it can be seen that, when the arm 1 sweeps O'B, the arm 2 sweeps on a fixed axis which is perpendicular to Oy at O'' a distance AD which is proportional to:

$$\tan (\beta - \epsilon) + \tan \epsilon = \frac{\tan \beta (1 + \tan^2 \epsilon)}{1 + \tan \epsilon \tan \beta}$$

which can be expressed as:

$$y = \frac{A_x}{1 + B_x}$$

wherein $A = 1 + \tan^2 \epsilon$ and $B = \tan \epsilon$.

In the embodiment which is illustrated in FIG. 2, the different elements of the device are mounted in an airtight chamber 3 in which the static pressure $P_s$ prevails. An empty capsule 4 controls by means of the rod 5 a lever 6 which is adapted to pivot about the pin 7 and which is provided at its extremity with a guide pin 8. Said guide pin 8 is adapted to slide within an elongated slot 9 which is formed at right angles to the axis $y'y$ in the movable support 10. Said support 10 is provided with a second guide pin or stud 11 which is engaged within a slide 12 formed at the extremity of the arm 1 of a pivotal lever having two arms 1, 2. The fixed point O of pivotal motion of said lever is located on the axis $y'y$ which is perpendicular to the mean position of the lever 6.

There is also mounted inside the chamber 3 a capsule 13, the interior of which is subjected to the total pressure $P_t$ and which is subjected externally to the pressure $P_s$ which prevails within the chamber 3. Said capsule controls by means of the rod 14 a lever 15 which is pivotally mounted about the pin 16 on which a second lever 17 is also pivotally mounted. The lever 15 which is balanced by the weight-head 33 at one end thereof is provided at the other end thereof with a magnetic core 18 which is movable within a coil 19 of a differential transformer carried by the lever 17. Said lever 17 is additionally provided at its extremity with a stud 20 which is engaged within an elongated slot 21 of the support 22. Said support 22 is slidably mounted at right angles to the axis $y'y$ on the fixed frame of the apparatus and the support 10 is slidably mounted parallel to said axis $y'y$ on the support 22.

The arm 2 of the double lever 1-2 makes an angle with the line of extension of the arm 1 and is provided at the other end with a slide 23. There is engaged in said slide a guide pin 24 which is mounted on a support 25, said support 25 being capable of carrying out a movement of translation at right angles to the axis $y'y$. The movement of said support 25 is effected through the intermediary of the gear-train 26 and the screw 27 by means of a servo-motor generator 28 which is in turn supplied from the differential transformer 19 via the amplifier 29. The screw 27 controls a potentiometer 32 by means of the gears 30 and shaft 31.

The device operates as follows: the static pressure $P_s$ which produces action on the capsule 4 controls, through the intermediary of the lever 6 and slot 9, the displacement of the support 10 parallel to the axis $y'y$, and therefore the ordinate of the guide pin 11 relatively to the axis Ox which is perpendicular to $y'y$. The assembly is so regulated that said ordinate is $$y = K_2 P_s$$

The capsule 13 is subjected to a deformation which is proportional to $P_t - P_s = \Delta P$ and controls the position of the magnetic core 18 within the coil 19 by means of the lever 15. The displacement of the core 18 develops a voltage which, by means of the amplifier 29, operates the servo-control motor generator 28. The motor 28 causes the screw 27 to rotate and therefore controls the abscissa of the guide pin 24. Any displacement of the guide pin 24 controls, by means of the slide 23 and the lever arms 2 and 1 and the slide 12, the abscissa of the guide pin 11, therefore of the elongated slot 21 and consequently of the guide pin 20, therefore finally the angular position of the pivotal lever 17, therefore of the coil 19.

The controlled device remains in equilibrium at a standstill when the relative position of the core 18 and the coil 19 is such that the voltage developed across the terminals of the coil 19 is zero. The adjustment is such that, under these conditions, the guide pin 11 has as abscissa with respect to the axis $y'y$.

$$x = K_1 \Delta P$$

Under these conditions, the lever 1 makes with Oy an angle $\beta$ so that:

$$\tan \beta = \frac{K_1 \Delta P}{K_2 P_s} = \frac{K \Delta P}{P_s}$$

When $\beta$ is zero, the guide pin 24 is in position M and, to every displacement $$K = \frac{\Delta P}{P_s}$$

of the support 22, there corresponds a displacement $$K = \frac{V^2}{T}$$

of the support 25 and consequently a movement of rotation of the screw 27 which is proportional to $V^2/T$.

The potentiometer 32 which is controlled by the screw 27 and to which is applied a voltage $-U$, delivers a voltage $$-U' = -U \frac{V^2}{T}$$

The computing of V on the basis of $$K = \frac{V^2}{T}$$

can be made by means of a device such as that which is represented in FIG. 3.

A potentiometer 35 which is driven in rotation by a shaft 36 effects by means of its output voltage and by means of the amplifier 37 the supply of current to the potentiometer 32 which has been previously mentioned (in reference to FIG. 2) and the movement of rotation of which is proportional to $V^2/T$.

The output voltage of the potentiometer 32 penetrates via the line 38 into the servo-amplifier 39 which by means of the motor generator 40, produces the rotation of the shaft 41 which is common to the two potentiometers 42 and 43.

The voltage which is delivered by the potentiometer 43 is employed for the purpose of supplying the potentiometer 42 via the amplifier 44. The voltage delivered by said potentiometer 42 is directed to the servo-amplifier 39.

The device referred-to above is utilized as follows: The temperature T is measured, for example, by means of a platinum-resistance probe of known type which, by virtue of a conventional control system, imparts to the shaft 36 a movement of rotation which is proportional to T.

The potentiometer 35 which is supplied with the voltage $-U_o$ delivers a voltage $$-U = -U_o T$$

The potentiometer 32 then delivers a voltage $$-U' = -U \cdot \frac{V^2}{T} = -U_o \cdot T \frac{V^2}{T} = -U_o V^2$$

The motor 40 produces a rotation $x$ of the shaft 41.

If the potentiometer 43 is supplied with a voltage $+U_o$, it delivers a voltage $+U_o x$ and the potentiometer 42 accordingly delivers a voltage $+U_o x \cdot x = +U_o x^2$.

The amplifier 39 therefore receives on the one hand a voltage $-U_o V^2$ from the potentiometer 32 via the line 38 and on the other hand, a voltage $+U_o x^2$ from the potentiometer 42.

If then $U_o V^2 = U_o x^2$, namely $V = x$, the amplifier 39 will be at a zero voltage; the control of the potentiometers 42, 43 is stopped and these latter are locked at an angle; $x = V$ indicating the computed velocity.

As will be apparent, the invention is not limited in any sense to the constructional details which have been illustrated or described and which have been given solely by way of example. It accordingly follows that, in particular, the pivotal double-lever system could be replaced by any system for calculating an homographic function; that the device could be designed for the purpose of measuring with precision velocities comprised between any two velocities instead of being designed for low velocities; that the two supports 10 and 22 could be rigidly coupled to each other and have two degrees of freedom with respect to the fixed frame; that the differential transformer (18, 19) could be replaced by a system of contacts on the levers 15 and 17 so as to cause the motor 28 to rotate either in one direction or in the other depending on the contacts which are employed; that the differential transformer could also be replaced by a system comprising a light source and photodiodes on the levers 15 and 17 respectively in such a manner as to cause the motor to rotate either in one direction or in the other depending on the diode which is illuminated; that the inductive receiver system could be replaced by any other capacitive system.

What I claim is:

1. Compensated anemometer for measuring of the actual air velocity V of an aircraft with respect to the air, having a capsule subjected to the total pressure $P_t$, said anemometer comprising means responsive to static pressure $P_s$, means responsive to the difference $\Delta P$ between said total pressure and said static pressure, means for measuring the absolute temperature T, movable means having a position which is a function of the quantity $$x = \frac{\Delta P}{P_s}$$

and which is controlled by said means responsive to $\Delta P$ and to said means responsive to $P_s$, means controlled by said quantity $x$ and having a position function of the quantity $y$ which is an homographic function of $x$:

$$y = \frac{Ax}{1 + Bx}$$

wherein A and B are chosen so that $y$ acquires the value:

$$1 - \frac{1}{\left(1 + \frac{\Delta P}{P_s}\right)^{1/3.5}}$$

in respect of two arbitrarily selected values of the quantity $$x = \frac{\Delta P}{P_s}$$

and further means controlled by said means for measuring T, and said further means having a position function $y$ in such manner as to represent the quantity $V^2 = yT$.

2. Compensated anemometer for measuring of the actual air velocity V of an aircraft with respect to the air, having a capsule subjected to the total pressure $P_t$, said anemometer comprising means responsive to static pressure $P_s$, means responsive to the difference $\Delta P$ between said total pressure and said static pressure, means for measuring the absolute temperature T, a first rigid arm pivotally mounted in a fixed plane about a fixed point and controlled by said means responsive to $\Delta P$ and said means responsive to $P_s$ so that the angular coefficient of the direction of said first arm relatively to a fixed axis of said plane represents precisely a quantity proportional to the quantity $$x = \frac{\Delta P}{P_s}$$

a second rigid arm rigidly coupled to said first arm and displaced with respect thereof through an angle $\epsilon$, a member movable in a translation orthogonal to said fixed axis, the sliding motion of which is controlled by said second arm, so that the translational motion of said member represents the quantity $$y = \frac{(1 + \tan^2 \epsilon)x}{1 + x \tan \epsilon}$$

wherein $\epsilon$ is chosen so that $y$ acquires the value $$1 - \frac{1}{\left(1 + \frac{\Delta P}{P_s}\right)^{1/3.5}}$$

in respect of two arbitrarily selected values of the quantity $$x = \frac{\Delta P}{P_s}$$

and further means controlled by said means for measuring T, and said further means having a position function of $y$ in such manner as to represent the quantity $V^2 = yT$.

3. Compensated anemometer according to claim 2 wherein said first rigid arm is controlled by a first anemometer capsule subjected externally to the static pressure $P_s$ and in the interior of which is created a vacuum, and a second anemometer capsule subjected externally to the static pressure $P_s$ and the interior of which is subjected to the total pressure $P_t$.

4. Compensated anemometer for measuring of the actual air velocity V of an aircraft with respect to the air, having a capsule subjected to the total pressure $P_t$, said anemometer comprising means responsive to static pressure $P_s$, means responsive to the difference $\Delta P$ between said total pressure $P_t$ and said static pressure $P_s$, means for measuring the temperature T, a first rigid arm pivotally mounted in a fixed plane about a fixed point, a second rigid arm rigidly coupled to said first arm and displaced with respect thereof through an angle $\epsilon$, means controlling the angular position of said first and second arms and comprising means controlled by said means responsive to static pressure $P_s$ and said means responsive to the difference $\Delta P$ between said total pressure $P_t$ and said static pressure $P_s$ and a servomechanism comprising a first member controlled by said means responsive to said difference $\Delta P$ and a second member movable relatively to said first member, so that the angular coefficient of the direction of said second arm relatively to a fixed axis of said plane represents precisely a quantity proportional to the quantity $$x = \frac{\Delta P}{P_s}$$

a member movable in a translation orthogonal to said fixed axis, the sliding motion of which is controlled by said second arm, so that the translational motion of said member represents the quantity $$y = \frac{(1 + \tan^2 \epsilon)x}{1 + x \tan \epsilon}$$

wherein $\epsilon$ is chosen so that $y$ acquires the value $$1-\frac{1}{\left(1+\frac{\Delta P}{P_s}\right)^{1/3.5}}$$

in respect of two arbitrarily selected values of the quantity $$x=\frac{\Delta P}{P_s}$$

further means controlled by said means of measuring T, and said further means having a position function of $y$ in such manner as to represent the quantity $V^2=yT$.

5. Compensated anemometer according to claim 4 wherein said first and second members of said servo-mechanism comprise rigid arms pivotally mounted on the same axis and bearing cooperating parts, and wherein electric means are associated with said cooperating parts to develop a voltage in accordance with the respective positions of said parts.

6. Compensated anemometer according to claim 5 wherein said means representing the quantity $V^2$ comprises at least two potentiometers and a servo-amplifier fed by one of said potentiometers.

References Cited
UNITED STATES PATENTS

| | | | |
|---|---|---|---|
| 2,714,309 | 8/1955 | Redemske | 73—178 |
| 3,108,183 | 10/1963 | Ganley et al. | 235—151.3 |
| 3,209,593 | 10/1965 | Johanson | 73—182 |
| 3,239,140 | 3/1966 | Armstrong | 73—182 |
| 3,248,940 | 4/1966 | Ramsayer | 73—178 |
| 3,278,728 | 10/1966 | Ragsdale | 73—205 |

S. CLEMENT SWISHER, *Acting Primary Examiner.*

NEIL B. SIEGEL, *Assistant Examiner.*